Aug. 3, 1965  A. F. HILDEBRANDT ETAL  3,198,994
SUPERCONDUCTIVE MAGNETIC-FIELD-TRAPPING DEVICE
Filed Nov. 29, 1961

ALVIN F. HILDEBRANDT
DANIEL D. ELLEMAN
FRANK C. WHITMORE
INVENTORS

BY Lyon & Lyon
ATTORNEYS

United States Patent Office 3,198,994
Patented Aug. 3, 1965

3,198,994
SUPERCONDUCTIVE MAGNETIC-FIELD-TRAPPING DEVICE
Alvin F. Hildebrandt, La Crescenta, Daniel D. Elleman, La Canada, and Frank C. Whitmore, Altadena, Calif., assignors to California Institute Research Foundation, Pasadena, Calif., a corporation of California
Filed Nov. 29, 1961, Ser. No. 155,595
1 Claim. (Cl. 317—158)

This invention relates to magnetic-field-trapping devices. The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to apparatus for establishing a magnetic field and, more particularly, to improvements therein.

There are many scientific and technological operations, and there are many pieces of apparatus which require the establishment of a large magnetic field. Experiments with plasma use magnetic fields. Magnetic fields are used in magnetometer calibration; electronic and nuclear apparatus employ magnetic fields; motors, generators, and dynamos employ magnetic fields. There also are biological applications of magnetic fields. The apparatus for generating magnetic fields is well known and will not be set forth here. However, it is also known that a magnetic field which is established in air is not as intense as a magnetic field which exists within ferromagnetic material occupying the same space. Since any operations which are required to be performed within a magnetic field take place within air, it will be appreciated that if it were possible to transfer a magnetic field of a given intensity which exists within iron into air, both the limit of magnetic-field intensity obtainable in air today would be extended and, also much less energy would be expended for achieving a magnetic field in air of the same intensity as exists in iron.

An object of this invention is to provide apparatus which enables the establishment of a magnetic field in air having the same intensity as that existing within a ferromagnetic material.

Another object of this invention is the provision of apparatus for establishing a magnetic field in air which has the same intensity as that in a ferromagnetic material using only the energy required to establish the field in a ferromagnetic material.

Yet another object of the present invention is the provision of a novel, useful, and simple arrangement for establishing a magnetic field in air of a predetermined intensity employing less energy than thought required heretofore.

These and other objects of the invention are achieved in an arrangement wherein a core of ferromagnetic material is surrounded by a cylinder made of a material that has the property of superconductivity when it is cooled below a critical temperature. The core effectively is split so that it may be pulled apart when required to leave the center of the cylinder empty. Means are provided for establishing a magnetic field through the ferromagnetic mtal core. Thereafter, the cylinder of superconductive material is cooled below the critical temperature. The means for establishing a magnetic field is de-activated.. However, because of infinite conductivity of the superconductive cylinder, the magnetic flux which was established when the winding was excited remains trapped by reason of currents flowing on the walls. The core may then be removed from the cylinder, which still retains the trapped field. However, the trapped field now exists in air and has substantially the same intensity as it had in the presence of the core.

The novel features that are considered characteristic of this invention are set forth with particularity in the appended claim. The invention itself, both as to its organization and method of operation, as well as additional objects and advantages thereof, will best be understood from the following description when read in connection with the accompanying drawings, in which:

It is known that when certain metals are cooled below a very low characteristic temperature they exhibit properties such as substantially infinite electrical conductivity and an almost perfect diamagnetism—Meissner effect. The material also has the property that a current, once started, continues to flow, so that if a magnetic field is created and a closed circuit of superconductive material is established in the magnetic field, when the magnetic field is removed a current is induced in the closed circuit of superconductive material, which re-establishes and preserves the magnetic field. This is known as the flux-trapping property of the material.

Figure 1:
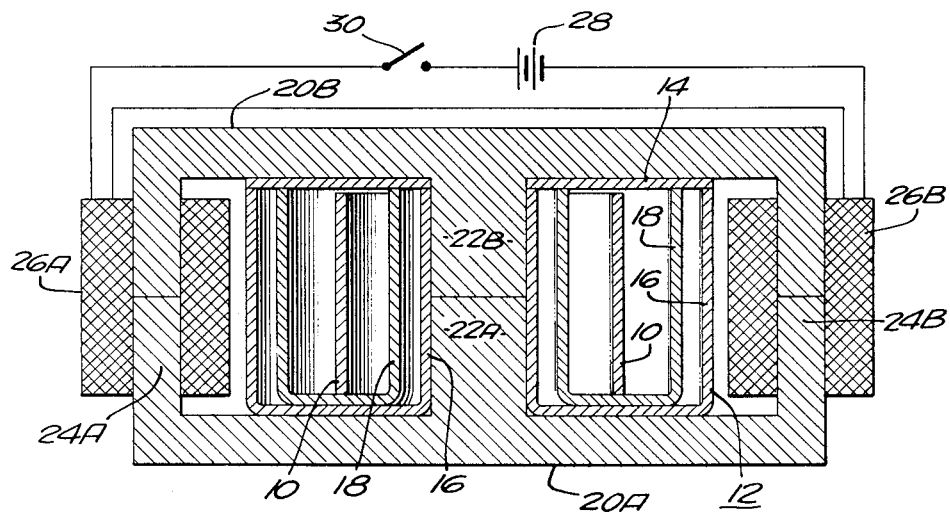
FIGURE 1 is a view in elevation of an embodiment of the invention.
Figure 2:
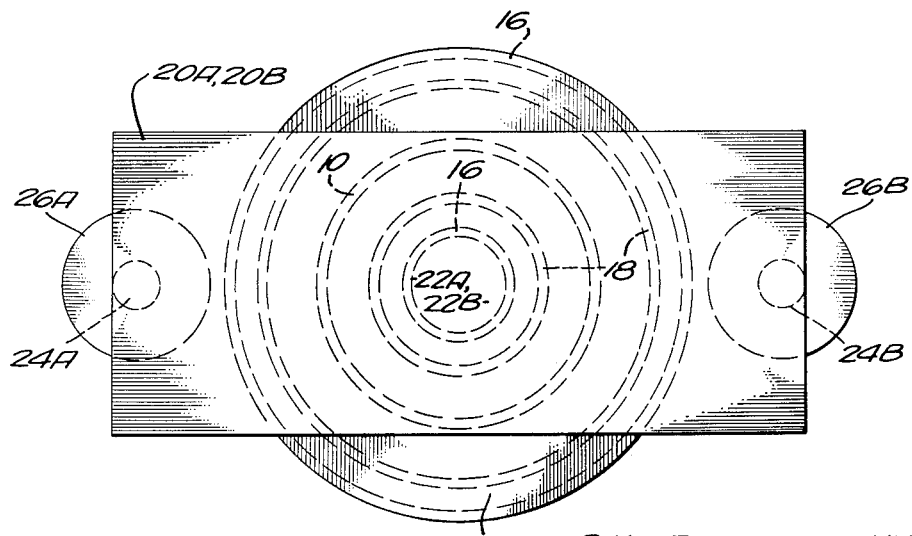
FIGURE 2 is a cross-sectional view of the embodiment of the invention.

Referring now to the drawings, FIGURE 1 is a view in elevation, and FIGURE 2 is a cross-sectional view of an embodiment of the invention. A cylinder 10 of the superconducting material is placed in a circular cryostat 12—that is, one having, when the cover 14 is in position, the appearance of two concentric tubes. These will include an outer tube 16, having double walls from within which air has been evacuated. The inner tube 18 also has double walls, from which air has been evacuated. The cylinder 10 is placed within the inner tube. When required for reducing the temperature of the cylinder 10, nitrogen may be placed in the space between the inner and outer tubes 16, 18 and helium may be placed within the inner tube 18.

A yoke, consisting of two parts, respectively 20A, 20B, has a core or central section 22A, 22B, which fills the central space of the cylindrical outer tube 16 and has leg portions, respectively 24A, 24B, which are also split and which are positioned outside of the outer tube walls 16. Two coils, respectively 26A, 26B, are fitted on the outer legs 24A, 24B. The coils are connected to a source of potential 28 through a switch 30.

The yoke has the opposing surfaces of the two halves thereof ground flat, so that they may intimately engage one another when the yoke is in the closed position shown in FIGURE 2. Initially, the cylinder 10 is maintained above the critical temperature. If desired, a first cooling liquid may be poured in the cryostat space between the inner and outer tubes 18, 16. The switch 30 is closed, whereby the coils 26A, 26B are energized. This establishes flux having a desired intensity through the core sections 22A, 22B. In an embodiment of the invention, a flux field on the order of 35,000 gauss can be obtained in the iron. A second cooling liquid may then be poured into the inner tube 18, whereupon the cylindrical shell of superconducting material 10 is reduced in temperature below the critical value. The magnetic field is then reduced to zero and the magnetic yoke 20A, 20B is then pulled apart and removed. As a result, a flux field is trapped within the cavity of the cylinder of superconducting material 10, which field is equal to the original flux in the iron divided by the cross-sectional area, $\pi R^2$, of the cylinder of superconducting material. The field may be employed for any desired purpose at this time. The cylinder 10 may be of niobium metal or lead, or any other superconducting material.

There has accordingly been described and shown herein a novel and useful arrangement for establishing in air a magnetic field having substantially the intensity obtainable in ferromagnetic material for the same magnetizing force. The existing magnetic field may be established in other ways than by electromagnetic excitation, such as by a permanent magnet, and other shapes for the superconductor than a hollow cylinder may be used without departing from the spirit and scope of this invention.

We claim:

Apparatus for establishing a magnetic field at a desired region comprising a cylinder which is hollow having walls made of a material having the property of superconduction when said material is cooled below a critical temperature, a yoke comprising a central core and an outer-leg portion, said yoke and outer-leg portion being split whereby the two portions thereof may be fitted together, said two portions being inserted and fitted together with said core inserted within the center of said cylinder and with said outer leg portion and enclosing said cylinder, means for applying a magnetomotive force to a leg of said yoke for establishing a magnetic field through said core with the lines of flux parallel to the axis of said cylinder, means for cooling said cylinder walls below said critical temperature, and means for discontinuing the application of said magnetomotive force whereby a magnetic field is trapped within the center of said cylinder, and when the portions of said yoke are pulled apart and removed from said cylinder the magnetic field remains behind.

References Cited by the Examiner

UNITED STATES PATENTS 2,916,615 12/59 Lundburg ---------- 340—173.1
2,946,030 7/60 Slade ---------------- 336—155

JOHN F. BURNS, *Primary Examiner.*

E. JAMES SAX, *Examiner.*